United States Patent
Lease

[15] 3,643,550
[45] Feb. 22, 1972

[54] POWER TRANSMISSION
[72] Inventor: Robert J. Lease, Rochester, Mich.
[73] Assignee: Sperry Rand Corporation, Troy, Mich.
[22] Filed: Feb. 16, 1970
[21] Appl. No.: 11,528

[52] U.S. Cl. ..........................................................91/506
[51] Int. Cl. .......................................................F04b 1/20
[58] Field of Search ..........................................91/564–566; 92/12.2; 116/124

[56] References Cited

UNITED STATES PATENTS

| | | | |
|---|---|---|---|
| 2,696,189 | 12/1954 | Born et al. | 417/63 |
| 2,409,185 | 10/1946 | Blasutta | 42/12.2 |
| 3,463,087 | 8/1969 | Grant | 92/12.2 |
| 2,366,330 | 1/1945 | Girffith et al. | 116/124 |

Primary Examiner—William L. Freeh
Attorney—Van Meter and George

[57] ABSTRACT

A variable displacement piston pump or motor unit has an oscillatable yoke controlled by double-acting preloaded spring centering mechanism. Abutments are provided in the casing and on the yoke between which a tool may be wedged to hold the yoke in neutral position while the centering springs are being adjusted. The housing has openings providing access for the tool, which openings may also serve as fluid connections.

3 Claims, 4 Drawing Figures

INVENTOR.
ROBERT J. LEASE

ATTORNEYS

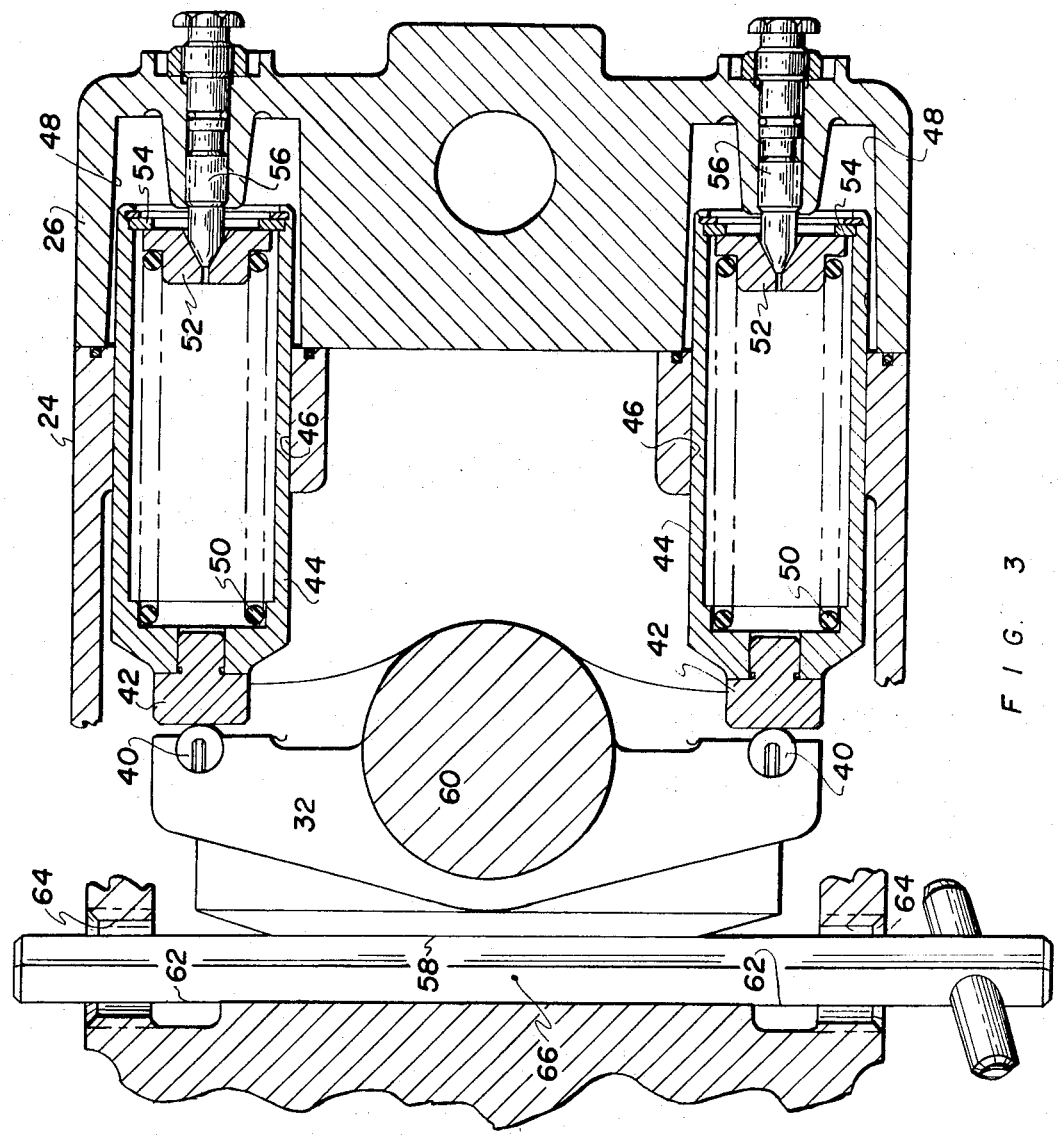
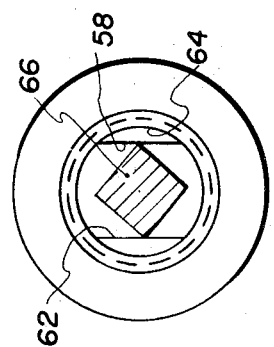

POWER TRANSMISSION

Variable displacement piston pumps are sometimes difficult to adjust to a precise neutral position wherein no flow or creep is permitted. Many applications of hydraulic power transmissions experience this problem, as for example in automotive drives, where it is essential that the drive be effectively discontinued in the neutral position. One solution to this problem utilizes preloaded double-acting centering springs which hold the control member in exact neutral when no other force, as for example from a manual lever, is applied to it. Such devices, however, require a rather tedious adjustment of the centering springs at initial manufacture and setup.

It is an object of the present invention to provide an axial piston pump or motor unit wherein precise alignment abutments are provided on the adjustable control member and on the housing which may be brought into precise fixed relationship by a tool inserted therebetween for the purpose of holding the member in a true centered position while the centering springs are being adjusted.

The invention consists of the provision in an axial piston pump or motor unit having a tiltable swash plate yoke for varying the displacement of the unit and a housing in which the yoke is journaled, of abutments providing alignment faces on both the yoke and on the housing, between which a tool may be inserted to cam the yoke into a predetermined positional relation with respect to the housing.

FIG. 3 is a fragmentary section corresponding to FIG. 2 showing the parts in a different position.

FIG. 4 is a longitudinal sectional view of the pump taken on the section including the tool.

Figure 1:
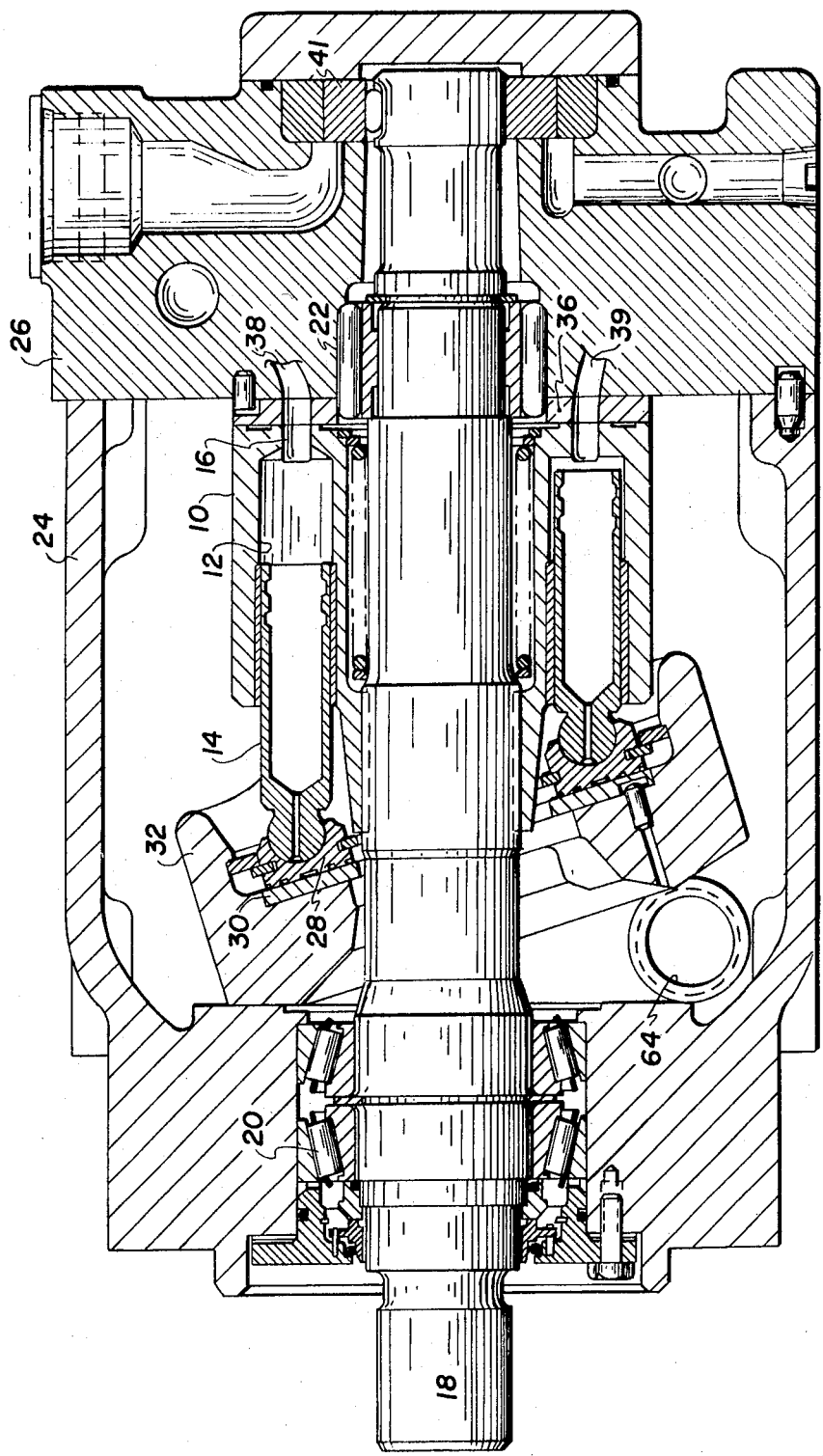
FIG. 1 is a longitudinal cross section of a variable displacement piston pump incorporating a preferred form of the present invention and is taken on the section including the drive shaft of the device.

The invention is illustrated as applied to a piston pump of the in-line axial piston type and may comprise a rotary cylinder barrel 10 having a plurality of bores 12 in which pistons 14 reciprocate to alternately ingest and expel liquid through ports 16 in the end face of the barrel 10. A drive shaft 18 is journaled on bearings 20 and 22 in a housing which consists of a main case 24 and an end closure 26 bolted thereto. The pistons 14 have ball-jointed shoes 28 slidable on a swashplate 30 carried by a cup-shaped yoke 32. The yoke 32 is oscillatable in bearings in the housing for the purpose of controlling the stroke of the pistons 14 as the cylinder barrel is rotated. A flat valve plate 36 is mounted on the inner face of the end member 26 and commutates the flow of liquid into and out of the cylinder ports 16 with respect to the supply and delivery passages 38 and 39. An auxiliary gear pump 41 may be provided in the end of the closure member 26 for supplying fluid for auxiliary control purposes. The construction is typical of the many forms of variable displacement units with which the present invention may be utilized.

Figure 2:
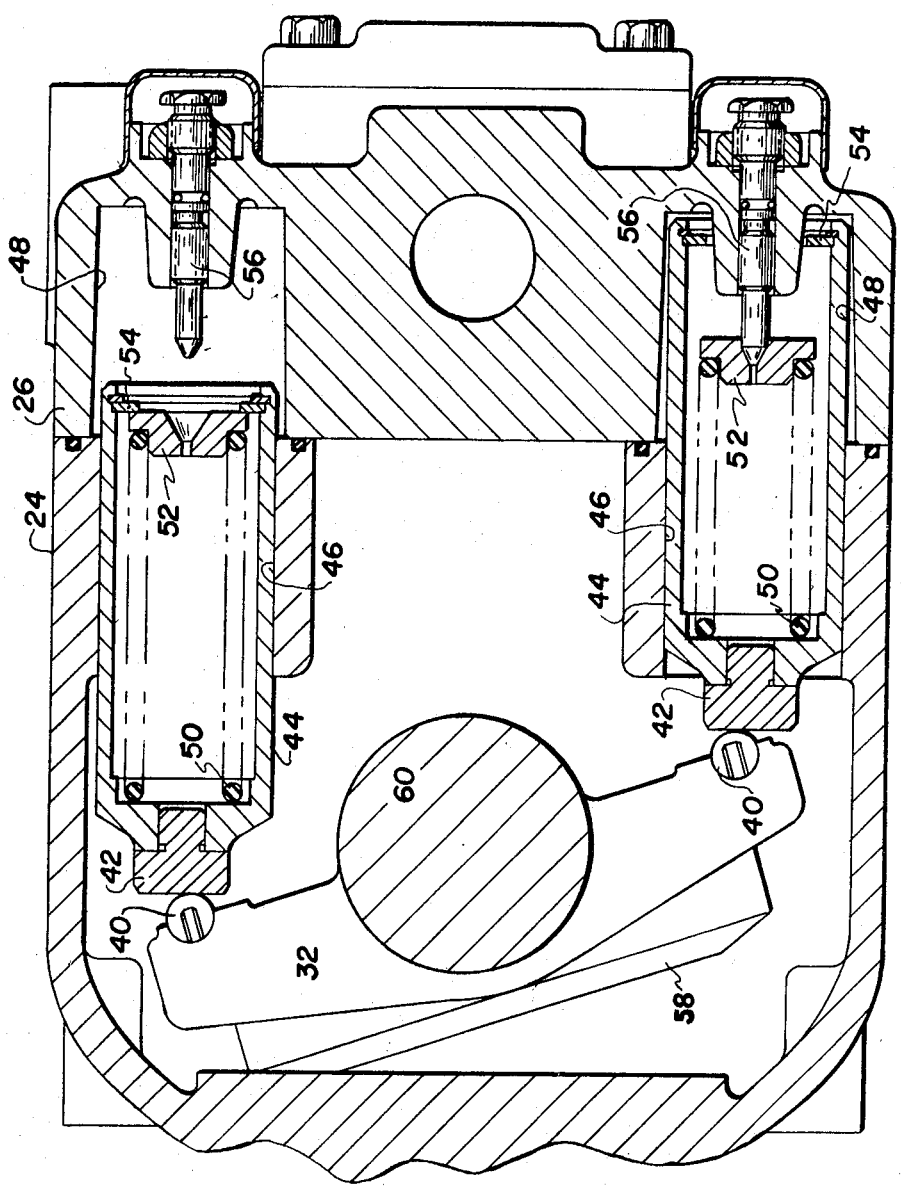
FIG. 2 is a longitudinal sectional view of the same pump taken on a parallel plane to, but spaced from, that of FIG. 1.

For the purpose of controlling the yoke 32 and to hold it in centered or neutral position whenever no other forces are acting upon it, there is provided a double-acting preloaded centering spring mechanism illustrated in FIGS. 2 and 3. The yoke 32 may be provided with a pair of cylindrical abutment pins 40 against which the noses 42 of a pair of plungers 44 may abut. The plungers 44 slide in bores 46 in the housing 24 and extend into recesses 48 in the end closure 26. The plungers 44 carry springs 50 and may also serve as fluid-operated control pistons for moving the yoke 32 off center by the admission of fluid to one or the other of the chambers 48.

The springs 50 are preloaded by means of shiftable abutments 52 which may rest against abutment rings 54 in the plungers 44 or against adjusting screws 56 or both. The screws 56 may be adjusted from the outer face of the end closure 26.

When properly adjusted, there will be no play between the abutments 52 and either abutment 54 or adjusting screw 56. However, such a condition of adjustment without lost motion may be achieved in various positions of the yoke 32 adjacent its true center position and the fact that a given adjustment achieves the elimination of end play in the centering mechanism does not mean that the yoke is positioned so that its swashplate 30 is an exact parallelism with the valve plate 36. This condition is necessary if there is to be no fluid delivery by the pump.

For the purpose of holding the yoke 32 in its true neutral position, its backface is machined to provide an abutment surface 58 which can readily be machined parallel to the surface on which swashplate 30 rests. This abutment face 58 is located at one side of the center of the yoke 32 and parallel to the tilting axis of the yoke.

The housing 24 is provided with an abutment 62 which is in general alignment with the abutment 58 and has its face machined exactly parallel to the end face of the housing 24 which, of course, is parallel to the valve plate 36. One or more openings 64 are provided in the housing 24 adjacent the abutment 62. These openings may be threaded to provide fluid connections to the interior of the housing, but by locating them in the position illustrated, they may provide also for access to the abutments 58 and 62 for a tool such as indicated at 66.

The tool 66 may consist simply of a square bar long enough to extend across the abutment 62. The size of the bar 66 is such that the side of the square is less than the distance between abutments 58 and 62 when yoke 32 is in neutral, but the diagonal of the square is greater than this distance. Thus, by inserting the tool 66 between the abutments and turning it, a camming or wedging action is produced serving to hold the yoke 32 in a position exactly parallel with the valve plate. While thus held in true centered position, it is possible to establish through adjustment of the screws 56, a relationship of the abutments 52, 54 and 56 in which there will be not lost motion. When this adjustment is established, the tool 66 may then be removed and suitable closures or connection pipes applied to the openings 64.

It will be seen then that the invention provides a ready means of establishing a precise neutral adjustment for an axial piston variable displacement pump unit in a simple and ready fashion.

I claim:

1. In an axial piston pump or motor unit having a cylinder barrel rotatable relative to a stationary commutating valve plate, a drive shaft in line with and drivingly connected to the cylinder barrel, a set of pistons reciprocable relative to the cylinder barrel, a tiltable swashplate yoke for causing reciprocation of the pistons through strokes of adjustable length, the combination therewith of a housing enclosure formed with journals for the shaft and journals for the yoke on an axis intersecting the shaft axis perpendicularly, at least one access hole in the housing spaced from the shaft and yoke journal axes, fixed abutment means on the yoke presenting an alignment face in predetermined relation to the swashplate plane and further abutment means on the housing in predetermined relation to the valve plate plane, both said alignment faces being accessible to a tool inserted through the access hole.

2. A unit as defined in claim 1 wherein a tool comprising a bar having camming surfaces is positioned between the alignment faces of the yoke to cam and hold the yoke with the swashplate parallel to the valve plate while the centering device is being adjusted.

3. A unit as defined in claim 1 wherein a tool comprising a straight bar of square cross section is positioned between the alignment faces, the side dimensions of the square being less than the spacing of the faces when parallel and the diagonal of the square being greater than that spacing.

* * * * *